Feb. 17, 1925.

M. FAGAN 1,526,631

WIND MOTOR

Filed May 5, 1924  2 Sheets-Sheet 1

INVENTOR.
Michael Fagan
BY Westall and Wallace
ATTORNEYS

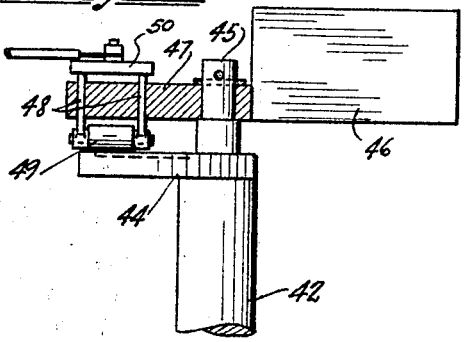
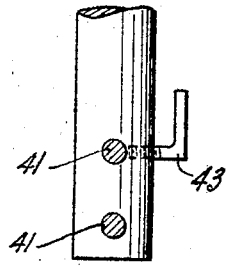
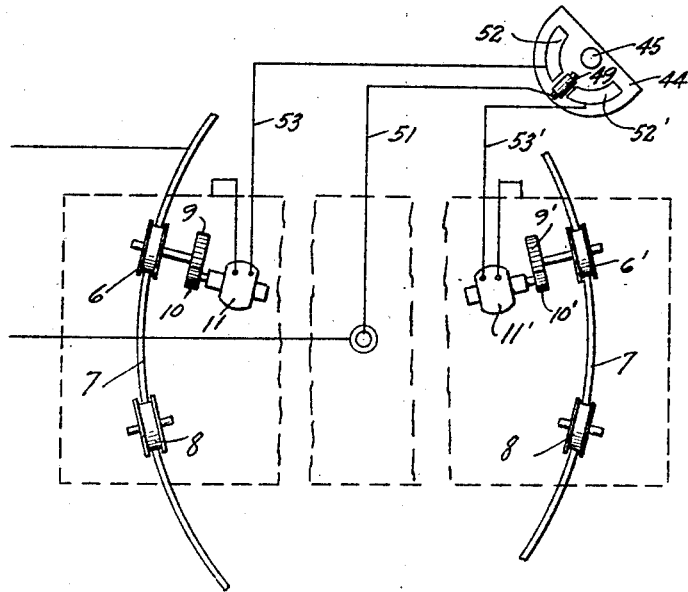

Patented Feb. 17, 1925.

1,526,631

UNITED STATES PATENT OFFICE.

MICHAEL FAGAN, OF VENICE, CALIFORNIA.

WIND MOTOR.

Application filed May 5, 1924. Serial No. 711,018.

*To all whom it may concern:*

Be it known that I, MICHAEL FAGAN, a citizen of the Irish Free State, and resident of Venice, in the county of Los Angeles, State of California, have invented new and useful Improvements in a Wind Motor, of which the following is a specification.

This invention relates to a motor designed to transform air currents into mechanical or electrical energy and has for its primary object the provision of a highly efficient means for effecting this transformation.

Another object of this invention is the provision of a simple and novel means for maintaining the impeller carrying frame in proper position to receive the wind. The present invention pertains more especially to a wind motor of large capacity and a further object of the invention is the provision of details of structure for economically building and maintaining the motor in operation.

The embodiment illustrated herein comprises a series of impeller sails or vanes mounted on an endless carrier, the carrier being disposed on a turntable revoluble on a base together with a wind board or rudder for maintaining the turntable and parts mounted thereon in proper relation to the wind for efficient operation.

Figure 1:
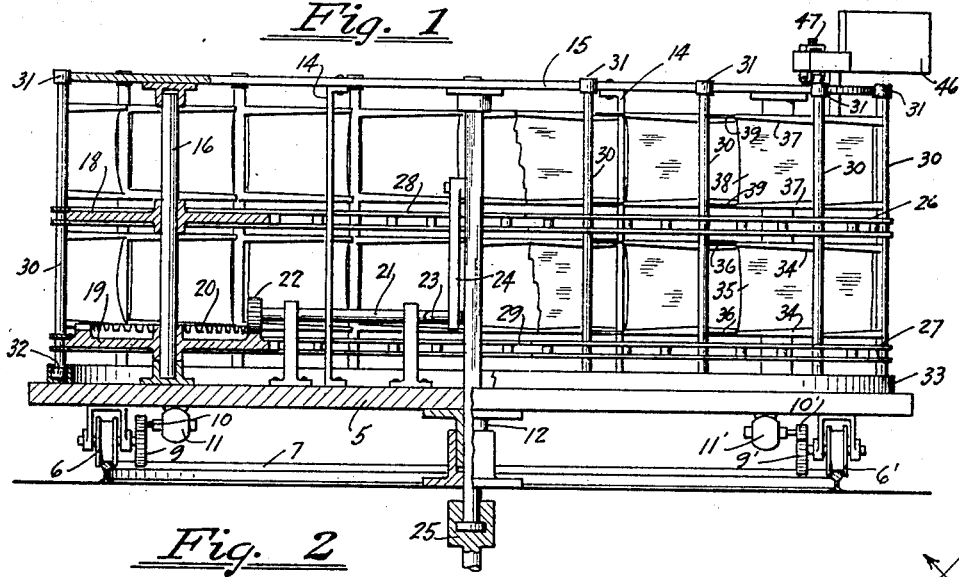
Figure 2:
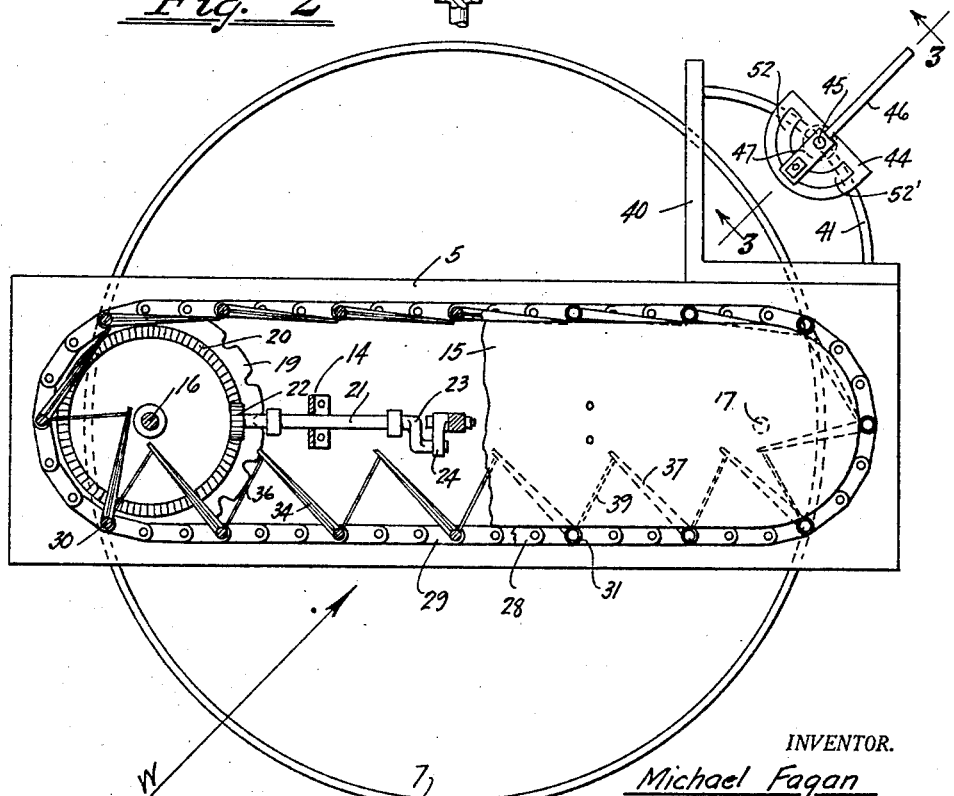

I accomplish these objects together with other objects and corresponding accomplishments by means of the embodiment of my invention illustrated in the accompanying drawings, in which:

Fig. 1 is an elevation partly in section of a complete machine; Fig. 2 is a plan view of the device shown in Fig. 1; Fig. 3 is an elevation as seen looking in the direction of the arrows 3—3 of Fig 2; and Fig. 4 is a diagrammatic view in plan illustrating the wind board control structure.

Referring more particularly to the drawings, a turntable is indicated by 5. This table carries the wind vanes and associated structures. The table is supported upon motor operated trucks secured to the under side of the table and having wheels 6 and 6'. The wheels ride upon a circular track 7. The track may be supported upon any suitable structure, below which may be disposed suitable devices to be operated by the wind motor, such as electric generators, pumps or the like. Wheels 8 are also provided to stabilize the turntable. The wheels 6 are mounted upon live axles carrying gears 9 meshing with pinions 10 carried upon the shafts of electric motors 11 and 11'. The connections between the motors and wheels may be varied to suit conditions. At the center of the turntable is a well 12, through which an operating rod or like structure may pass. The means for controlling operation will be later described.

Spaced from the turntable and supported above the same by suitable standards 14 is a top 15, whose outer edge conforms to the path of travel of the endless carrier later described. Journalled in bearings on the table and top is a driven shaft 16. A similar shaft 17 is journalled in the frame formed by the top and turnable at the opposite end thereof. However, shaft 17 is an idler shaft. Fixed to shaft 16 is a large sprocket wheel 18 disposed about half way between the ends. Adjacent the lower end of shaft 16 and fixed thereto is a sprocket wheel 19 having laterally extending gear teeth 20 forming a crown gear. Mounted on the turntable in suitable bearings and extending horizontally thereof is a shaft 21 having at the end thereof a pinion 22 meshing with the crown gear teeth 20. The shaft 21 has a crank 23 to which is attached a connecting rod 24 secured to a reciprocating member 25 disposed in the well 12 and serving to operate devices disposed below the table. Shaft 17 has sprocket wheels 26 and 27 corresponding to the wheels 18 and 19. Passed over wheels 18 and 26 is chain 28, and passed over wheels 19 and 27 is a chain 29. Extending between chains 28 and 29, and projecting above chain 28 are masts 30. Masts 30 have journalled upon their upper ends rollers 31 to ride against the outer edge of the top 15. The lower ends of masts 30 are provided with rollers 32, see Fig. 1, which are disposed in a guide channel 33 fixed to the top of turntable 5. The parts just described comprise a carrier of the endless type for impellers or sails. It will be noted that by this structure the masts will be maintained rigidly in an upright position during their travel. Booms 34 are hinged to the masts 30 between chains 28 and 29, and to these booms are connected sails 35. The booms are held in proper relation by ropes or cables 36. Above the chain 28 and hinged to the masts 30 are booms 37 to which sails 38 are secured. These booms are maintained in proper position by ropes or cables 39. Thus, impellers are formed above the chains of the same character as the impellers below. Wind or air currents moving in the direction indicated by the arrow W of Fig. 2 will impinge upon the impellers upon the front side of the motor, and cause the latter to travel toward the right, and pass around to the rear of the motor. The travel of the impellers causes the chains to rotate shaft 16 and power to be transmitted therefrom to shaft 21.

However, the wind shifts, as well known, and in order to maintain the turntable and impellers in proper position for most efficient operation, a wind board control is provided. Secured to the turntable at one end thereof is a frame 40 having two arms extending at an angle and provided with an arcuate support consisting of spaced rods 41 extending between the arms of the frame. A post 42 has openings therein through which pass the rods 41. It is obvious that the post may be moved along the rod 41 to position it at any desired point between the arms and the frame 40. To hold the post in a selected position, a clamp screw 43 is mounted in the post to engage one of the rods 41. Mounted on top of the post is a sector board 44. Post 42 is reduced in diameter to form at the top a pintle 45, upon which a wind board 46 is pivotally mounted. The forward end of the wind board is formed by an arm 47, through which extend bores slidably receiving the stems 48 of bearings carrying a metallic roller 49. The roller rides upon the sector board 44, and the mounting of the roller 49 upon the wind board is such as to permit vertical movement of the roller to compensate for inequalities in alignment and adjustment.

Roller 49 is electrically connected to stems 48 which in turn are connected to a bridge 50 at their upper ends, the bridge being electrically connected to one terminal of conductor 51. Mounted upon the sector board are arcuate metallic straps 52 and 52' insulated from each other and forming electrical contacts for the roller 49. Contact 52 is connected by a conductor 54 to the motor 11, while contact 52' is connected by a conductor 53' to a motor 11'. The other terminals of the motor are electrically connected to the other side of the line supplying the current.

It is obvious that when the wind board 46 is so disposed that the roller 49 is intermediate the contact straps 52 and 52' in neutral position, no current will flow to either motor 11 or 11'. The turntable and control may be adjusted to give the most effective position for the direction in which the wind is blowing normally by adjusting the post 42 upon the rods 41, so that the wind board in its neutral position will be in line with the direction of the wind and the impellers so positioned as to operate most efficiently. If the wind veers, the wind board 46 will be swung in one direction or the other so as to position roller 49 upon either strap 52 or 52'. Assuming that the roller has moved upon strap 52. Current is than supplied to the motor 11 to operate the drive wheel 6, and thereby revolve the turntable, wind board 46 swinging until the roller rides into neutral position. Thereupon, the motor will stop operating, the turntable having reached its most efficient position. If the wind board moves to swing the roller 49 upon contact 52', motor 11' will be operated to revolve the turntable in the opposite direction the wind board swings upon the pintle so as to bring roller 49 into its neutral position, and operation of the motor 11' is discontinued. The space between straps 52 and 52' may be proportioned to allow a limited movement of the wind board without turning the table or the impeller frame. Thus, slight variations in the wind will not cause operation of the motor.

What I claim is:

1. In an air motor, a track, an oblong turntable structure movable on said track, upright shafts disposed at the ends of said frame, each shaft having a wheel intermediate its ends, and a wheel at the lower end thereof, an endless carrier comprising upper and lower flights of chains passed over said wheels, upright masts secured to said chains, a guideway for said masts on said turntable receiving the lower ends thereof, an upper frame on said structure its edge serving as an upper guideway, booms hinged to said masts, sails mounted on said booms so arranged that each mast carries a sail intermediate said chains and a sail above the upper chain; two motor operated trucks secured to said structure and riding on said rails, one being arranged to revolve said turntable structure in one direction and the other being arranged to revolve said structure in the opposite direction, a supporting post mounted on said structure at one end thereof so as to be adjustably positioned with respect to the center of said structure, a wind board pivotally mounted on said post, a horizontal plate below said wind board, spaced electric conductor straps, one connected to the motor of each truck, an electrical conductor roller operated by said wind board and forming one terminal of the electric circuit for the motors, whereby upon the roller engaging a strap the corresponding motor truck will be operated to move the structure into the wind.

2. In an air motor, a track, an oblong turntable structure movable on said track, upright shafts disposed at the ends of said frame, each shaft having a wheel intermediate its ends and a wheel at the lower end thereof, an endless carrier comprising upper and lower flights of chains passed over said wheels, upright masts secured to said chains, a guideway for said masts on said turntable receiving the lower ends thereof, an upper frame on said structure having an outer edge serving as an upper guideway, booms hinged to said masts, sails mounted on said booms so arranged that each mast carries a sail intermediate said chains and a sail above the upper chain; motor operated trucks secured to said structure and riding on said rails, one being arranged to revolve said turntable structure in one direction and the other being arranged to revolve said structure in the opposite direction, a supporting post mounted on said structure so as to be adjustably positioned with respect to the center of said structure, a wind board pivotally mounted on said post, electric contacts actuated by said windboard to operate either motor of said trucks as the board is moved out of neutral position, whereby movement of the wind board from neutral position will cause the structure to be swung into the wind by one of said trucks.

3. In an air motor, a track, an oblong turntable frame movable on said track, upright shafts disposed at the ends of said train, each shaft having a wheel intermediate its ends and a wheel at the lower end thereof, an endless carrier comprising upper and lower flights of chains passed over said wheels, upright masts secured to said chains, booms hinged to said masts, sails mounted on said booms so arranged that each mast carries a sail intermediate the chains and a sail above the upper chain; two motor operated trucks secured to said structure and riding on said rails, one being arranged to revolve said turntable structure in one direction and another being arranged to revolve said structure in the opposite direction, a supporting post mounted on said structure so as to be adjustably positioned with respect to the center of said structure, a windboard pivotally mounted on said post, a horizontal plate below said windboard, spaced electric conductor straps, one connected to the motor of each truck, an electric conductor roller operated by said windboard and forming one terminal of the electric circuit for the motors, whereby upon the roller engaging a strap, the corresponding motor trucks will be operated to move the structure into the wind.

4. In an air motor, a track, an oblong turntable frame movable on said track, upright shafts disposed at the ends of said frame, each shaft having a wheel intermediate its ends, and a wheel at the lower end thereof, an endless carrier comprising upper and lower flights of chains passed over said wheels, upright masts secured to said chains, booms hinged to said masts, sails mounted on said booms so arranged that the masts carry a sail intermediate the chains and a sail above the upper chain; two motor operated trucks secured to said structure and riding on said rails, one being arranged to revolve said turntable structure in one direction and the other being arranged to revolve said structure in the opposite direction, a supporting post mounted on said structure so as to be adjustable in position with respect to the center of said structure, a windboard pivotally mounted on said post, electric contacts operated by said windboard to operate either motor of said trucks as the board is moved out of neutral position and thereby maintain said structure in the wind.

5. In an air motor, a track, an oblong turntable structure movable on said track, upright shafts having a wheel intermediate its ends, and a wheel at the lower end thereof, an endless carrier comprising upper and lower flights of chains passed over said wheels, upright masts secured to said chains, a guideway for said masts on said turntable receiving the lower ends thereof, an upper frame on said structure its edge serving as an upper guideway, booms hinged to said masts, and sails mounted on said booms so arranged that each mast carries a sail intermediate said chains and a sail above the upper chain.

In witness that I claim the foregoing I have hereunto subscribed my name this 23rd day of April, 1924.

MICHAEL FAGAN.